United States Patent Office 3,474,153
Patented Oct. 21, 1969

3,474,153
DEHYDROGENATION OF ETHYLBENZENE TO STYRENE
Joseph P. Henry, South Charleston, and Loy A. Wilkinson, Charleston, W. Va., assignors to Union Carbide Corporation, a corporation of New York
No Drawing. Continuation-in-part of application Ser. No. 646,480, June 16, 1967. This application July 25, 1968, Ser. No. 747,459
Int. Cl. C07c 5/18, 15/10
U.S. Cl. 260—669                                    16 Claims

ABSTRACT OF THE DISCLOSURE

Ethylbenzene is dehydrogenated to styrene in the presence of steam by an improved process using nickel-containing stainless steel as a material of construction for the apparatus employed in the process. This dehydrogenation reaction can be effected in a single reactor or in a plurality of reactors in series. Steam may be added in several ways. It may be added directly to the feed, or it may be introduced at several points along the reactor. In multiple-stage reactor system, the effluent from each reactor can be reheated directly or indirectly prior to their introduction into the subsequent reactor. The use of nickel-containing stainless steel as material of construction for the apparatus employed in this process provides for improved overall operation.

---

This application is a continuation-in-part of application Ser. No. 646,480, filed June 16, 1967 and now abandoned which is in turn a continuation-in-part of application Ser. No. 365,350, filed May 6, 1964, now U.S. Patent 3,326,996.

This invention relates to an improved process for the dehydrogenation of alkylated aromatic hydrocarbons and is particularly related to the use of nickel-containing stainless steel as a material of construction for the apparatus employed in carrying out this process.

The dehydrogenation of ethylbenzene to styrene is a well-known process to which the art has devoted considerable attention. At the present, there are numerous commercial plants in which styrene is produced either by the so-called low conversion process or by the more recently developed high conversion method. In the former and heretofore conventional process, ethylbenzene, preferably vaporized, is mixed with steam in the proper proportions and the mixture is contacted with a conventional iron-based dehydrogenation catalyst for a brief period of time at 500 to 700° C. The reaction mixture is thereafter immediately cooled and the styrene recovered, usually by distillation from the reaction mixture. This operation is illustrated in U.S. 2,831,907 to F. D. Mayfield et al.

It has long been recognized that this dehydrogenation reaction is highly endothermic and the reaction is accompanied by a considerable temperature drop across the reactor. Accordingly, the conversion of ethylbenzene to styrene by the low conversion process has usually been limited to about 38% at high efficiencies. Various attempts have heretofore been made to increase the styrene conversion when dehydrogenating ethylbenzene. Some of these have been directed to changing the catalyst composition while other attempts have been directed to the process steps and conditions.

Basically, the prior art workers in this area have recognized that the limitation in the conversion to styrene in this process is due to the endothermic nature of the dehydrogenation reaction. In order to increase the conversion, heat must be supplied to the reaction mixture from some external source, or alternatively, the reactor effluent from one reactor zone must be reheated and further dehydrogenated in a subsequent reaction zone. This has evolved in the so-called high conversion process as illustrated in several patents such as U.S. 2,851,502 to W. H. Bowman et al., U.S. 3,118,006 to G. H. Lovett et al. and in applicants' copending application Ser. No. 365,350 filed May 6, 1964, now U.S. 3,326,996.

In the Bowman et al, patent ethylbenzene is dehydrogenated in a first reaction zone and the reactor effluent is reheated in a furnace prior to further dehydrogenation in a subsequent reaction zone. In the Lovett et al. patent the dehydrogenation reaction is carried out in a plurality of reaction zones with steam being added directly to the effluent from each reaction zone prior to further dehydrogenation in a subsequent reaction zone.

Another variation of the high conversion process involves dehydrogenation of ethylbenzene to styrene in a single reactor with split steam addition to the reactor. In this process, steam is introduced at various points along the reactor to provide the heat necessary for minimizing the temperature drop in the reactor.

In applicants' U.S. 2,326,996 the dehydrogenation of ethylbenzene to styrene is effected in a plurality of reaction zones with interstage heating. Vaporized ethylbenzene is introduced into a first reaction zone containing a conventional dehydrogenation catalyst along with the entire quantity of steam used in the process. The steam, which may have been superheated separately, is employed to raise the temperature of the effluent from the first reaction zone by indirect heat exchange in a heat exchanger preferably of the shell and tube type, and the very steam which is used to raise the temperature of the reactor effluent is mixed with the ethylbenzene feed to the first reaction zone.

The high conversion process generally results in about 60% to 65% conversion of ethylbenzene to styrene. This of course represents marked increase in production capacity.

In all of the foregoing processes, whether low or high conversion has been desired, the prior art workers in this field have uniformly avoided the use of high-nickel containing stainless steel as a material of construction for the apparatus employed therein. It has heretofore been believed that high nickel-containing stainless steel is harmful and detrimental when in contact with hydrocarbons at the temperatures employed in such processes due to excessive cracking and carbon formation. A leading reference in this field is a monograph by the American Chemical Society entitled "Styrene, Its Polymers, Copolymers and Derivatives," by R. H. Boundry and R. F. Boyer (Reinhold Publishing Corporation, 1952 Edition), which on page 37, specifically discloses the detrimental effect of nickel upon the dehydrogenation of ethylbenzene to styrene at elevated temperature due to carbon formation.

A recent patent relating to "High Temperature Reactions," i.e., U.S. 3,262,983 to R. J. Ladd et al. reaffirms the conclusion reached in the above article. It specifically discloses that the presence of nickel in steel in excess of about 1.5 percent tends to catalyze carbon formation in high temperature reactions such as the dehydrogenation of ethylbenzene to styrene. Thus notwithstanding their superior metallurgical properties, nickel-containing stainless steels have been catagorically rejected as a material of construction in processes involving these types of reactions.

Contrary to the prevalent views of the prior art workers in this area, it has been discovered that some of the so-called 18/8 type stainless steel materials are eminently suitable as materials of construction for the apparatus employed in the dehydrogenation of ethylbenzene to styrene. They are superior to other alloys which do not contain nickel in that they can withstand the temperature changes encountered in the reactors and the interstage heater without undergoing metallurgical deformation. Alloys which do not contain nickel or even those which contain a low amount of nickel tend to undergo metallurgical changes and deformations resulting from temperature changes in the reactor or heat exchanges. For example, when such alloys are employed as material of construction for the interstage heater in the process described in applicants' U.S. 3,326,996 the temperature gradient in the interstage heater may cause severe embrittlmeent of the alloy, therefore making it unsuitable for this purpose. These difficulties are not encountered when nickel-containing stainless steel are employed as the material of construction.

The use of nickel-containing stainless steel is also advantageous in the design and fabrication of the reactors employed in the foregoing processes. Alloys which do not contain nickel or even those which contain low amount of nickel also present severe embrittlement problems during start-up or shut-down of the reactor due to temperature changes within the reactor. As in the case of interstage heater, the use of the 18/8 type stainless steel as a material of construction for the reactor obviates these difficulties and permits the design and fabrication of larger reactors with correspondingly increased capacities. This is due to the superior welding characteristics and improved malleability of this material as compared to alloys which do not contain nickel.

By type 18/8 stainless steel is meant stainless steel alloys having the compositions established for types 304, 347, and 316 by the American Iron and Steel Institute.

Type 304 stainless steel can have the following composition:

| | |
|---|---|
| Carbon (maximum) percent | 0.08 |
| Manganese (maximum) do | 2.00 |
| Silicon (maximum) do | 1.00 |
| Chromium do | 18.00–20.00 |
| Nickel do | 8.00–12.00 |
| Iron | Remainder |

Type 347 stainless steel can have the following composition:

| | |
|---|---|
| Carbon (maximum) percent | 0.10 |
| Cb-Ta (minimum) | 10 XC |
| Chromium percent | 17.00–20.00 |
| Nickel do | 8.00–12.00 |
| Iron | Remainder |

Type 316 stainless steel can have the following composition:

| | |
|---|---|
| Carbon (maximum) percent | 0.08 |
| Manganese (maximum) do | 2.0 |
| Silicon (maximum) do | 0.75 |
| Nickel do | 11.0–14.0 |
| Chromium do | 16.0–18.0 |
| Molybdenum do | 2.0–3.0 |
| Iron | Remainder |

All of the foregoing percentages are by weight.

The use of these 18/8 type stainless steel as material of construction in the foregoing processes is particularly well suited at temperatures in excess of 500° C. The dehydrogenation of ethylbenzene to styrene is generally carried out at a temperature of about 500 to 700° C. This temperature refers to the temperature of the ethylbenzene-steam mixture in the reaction zone and its selection is well within the knowledge of a skilled operator.

The reactor dimension and its geometry are not narrowly critical in this invention. One or more reaction zones can be employed with direct or indirect heating to compensate for the temperature drop in each reaction zone.

The catalyst which can be employed in this process is any well-known dehydrogenation catalyst such as ferric oxide-potassium carbonate-chromium oxide, magnesium oxide-ferrous oxide-potassium carbonate, alumina-silica-nickel or any other suitable dehydrogenation catalyst heretofore employed for this purpose.

It should be mentioned that the present invention is equally applicable to processes for the dehydrogenation of alkylated aromatic hydrocarbons such as, for example, isopropylbenzene, diethylbenzene, etc., to produce vinyl-substituted aromatic hydrocarbons.

What is claimed is:

1. In a process for dehydrogenation of an alkylated aromatic hydrocarbon in the presence of steam at a temperature of from about 500° C. to about 700° C., the improvement which comprises carrying out said process in a reactor constructed from a material selected from the group consisting of types 304, 316 and 347 stainless steel.

2. The process of claim 1 in which the reactor is constructed from type 304 stainless steel.

3. The process of claim 1 in which the reactor is constructed from type 316 stainless steel.

4. The process of claim 1 in which the reactor is constructed from type 347 stainless steel.

5. The process of claim 1 in which said alkylated aromatic hydrocarbon is ethylbenzene.

6. The process of claim 2 in which said alkylated aromatic hydrocarbon is ethylbenzene.

7. The process of claim 3 in which said alkylated aromatic hydrocarbon is ethylbenzene.

8. The process of claim 4 in which said alkylated aromatic hydrocarbon is ethylbenzene.

9. In a process for dehydrogenation of an alkylated aromatic hydrocarbon in the presence of steam which comprises passing a mixture of said hydrocarbon and steam through a plurality of catalytic dehydrogenation zones, in series, at a temperature of from about 580° C. to about 650° C., reheating the effluent from each reaction zone prior to introduction into the subsequent reaction zone, the improvement which comprises carrying out said process in equipment constructed from a material selected from the group consisting of type 304, 316 and 347 stainless steel.

10. The process of claim 9 in which said alkylated aromatic hydrocarbon is ethylbenzene.

11. The process of claim 9 in which the equipment is constructed from type 316 stainless steel.

12. The process of claim 9 in which the equipment is constructed from type 347 stainless steel.

13. The process of claim 10 in which the equipment is constructed from type 316 stainless steel.

14. The process of claim 10 in which the equipment is constructed from type 347 stainless steel.

15. The process of claim 9 in which the reactors are constructed from type 304 stainless steel.

16. The process of claim 10 in which the reactors are constructed from type 304 stainless steel.

References Cited

UNITED STATES PATENTS

| | | |
|---|---|---|
| 3,248,441 | 4/1966 | Soderquist et al. |
| 3,262,983 | 7/1966 | Ladd et al. |
| 3,326,996 | 6/1967 | Henry et al. |

DELBERT E. GANTZ, Primary Examiner

CURTIS R. DAVIS, Assistant Examiner

Dedication 3,474,153.—*Joseph P. Henry*, South Charleston, and *Loy A. Wilkinson*, Charleston, W. Va. DEHYDROGENATION OF ETHYLBENZENE TO STYRENE. Patent dated Oct. 21, 1969. Dedication filed Dec. 27, 1974, by the assignee, *Union Carbide Corporation*.

Hereby dedicates to the People of the United States the entire remaining term of said patent.

[*Official Gazette March 25, 1975.*]